United States Patent

[11] 3,547,138

[72] Inventors Lonny R. Kelley
Ballston Lake;
Carl G. Ringwall, Scotia, N.Y.
[21] Appl. No. 760,850
[22] Filed Sept. 19, 1968
[45] Patented Dec. 15, 1970
[73] Assignee General Electric Company
a corporation of New York

[54] FLUIDIC HIGH TO LOW FREQUENCY CONVERTER CIRCUIT
7 Claims, 1 Drawing Fig.

[52] U.S. Cl. .......... 137/81.5
[51] Int. Cl. .......... F15c 1/12
[50] Field of Search .......... 137/81.5

[56] References Cited
UNITED STATES PATENTS

| | | | |
|---|---|---|---|
| 3,238,959 | 3/1966 | Bowles | 137/81.5 |
| 3,260,456 | 7/1966 | Boothe | 137/81.5X |
| 3,273,377 | 9/1966 | Testerman et al. | 137/81.5X |
| 3,292,648 | 12/1966 | Colston | 137/81.5X |
| 3,340,885 | 9/1967 | Bauer | 137/81.5 |
| 3,409,032 | 11/1968 | Boothe et al. | 137/81.5X |
| 3,460,554 | 8/1969 | Johnson | 137/81.5X |

*Primary Examiner*—Samuel Scott
*Attorneys*—Derek P. Lawrence, Thomas J. Bird, Jr., Lee H. Sachs, Frank L. Neuhauser, Oscar B. Waddell and Joseph B. Forman

ABSTRACT: A high frequency fluidic pressure signal is provided as one input signal to each of two flueric rectifier elements. There is a 180° phase differential between this signal input to the two rectifier elements. A second fluidic pressure signal of a fixed reference frequency is fed as the other input. The outputs of the two rectifier elements are filtered to provide a low frequency "push-pull" signal which is then fed to a flueric amplifier from which the circuit output is derived.

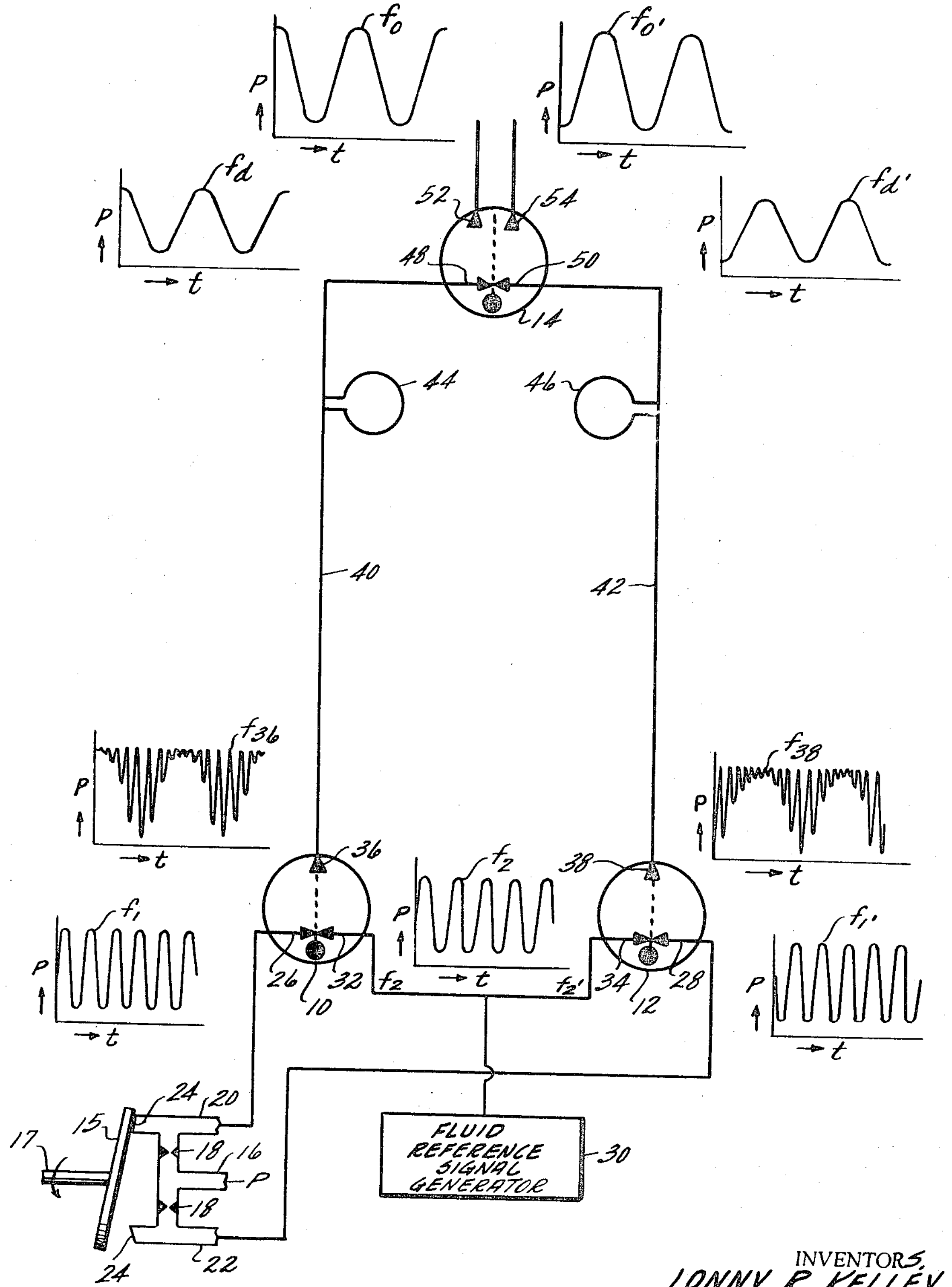
INVENTORS,
LONNY R. KELLEY
CARL G. RINGWALL
BY
[signature] III

FLUIDIC HIGH TO LOW FREQUENCY CONVERTER CIRCUIT

The present invention relates to improvements in flueric devices and more particularly to improved flueric devices for obtaining a signal having a relatively low rate of pressure fluctuation.

Fluidic and flueric devices are employed in many different ways to generate and employ fluid pressure signals in control functions or logic systems. One type of signal has a cyclic pressure variation or frequency, the rate of which has a known relation to some parameter in the control system.

One of the limitations of such devices is their inability to give fully accurate output signals and/or output signals of usable pressure levels where high-frequency signals are provided as inputs to, or generated in the system. Since high-frequency signals cannot be entirely avoided, it has been proposed to obtain a lower frequency by having a high-frequency signal as one input to a proportional amplifier and a second signal input of a different frequency. The two signals are both effective on the power stream and, through the use of appropriate filtering means results in a low-frequency output signal having a frequency which is the difference between the two input frequencies.

This approach however has the limitation that the output signal does not have a readily determined or accurate reference pressure relative to which the signal varies in a positive and negative fashion. Put another way, many fluidic circuit components require, for greatest accuracy that a signal input be represented by the differential pressure between two opposed control ports on opposite sides of a power stream. In the case of frequency signals the signal pressure variations at the opposite ports will be 180° out of phase relative to a constant or fixed datum pressure, providing what is called a "-push-pull" input.

One of the objects of the present invention is to provide a simple and effective means for reducing the frequency of fluidic signal and providing a "push-pull" output signal.

These ends are broadly attained by providing two rectifier flueric elements each having provision for two input signals which will be effective on a power stream. The power stream of the rectifier element is deflected relative to a receiver aligned with the nozzle from which the power stream is discharged. The recovered pressure in the receiver represents the output signal of the rectifier device.

In accordance with the present invention, a high frequency signal is fed as one input to each flueric rectifier device and a second signal is fed as the other input to the flueric rectifier devices. One signal has the same phase at both rectifier elements, while there is a 180° phase shift between the other signal inputs to the two rectifier elements. The outputs of the two rectifier elements are then filtered and may be fed to the opposed control ports of a proportional flueric amplifier. The power stream of this amplifier is deflected relative to a pair of receivers to generate therein recovered pressures which provide the desired low frequency "push-pull" output signal.

The above and other related objects and features of the invention will be apparent from a reading of the following description of the disclosure found in the accompanying drawing and the novelty thereof pointed out in the appended claims.

The single FIG. in the drawing schematically depicts a flueric circuit in accordance with the present invention and the fluidic signal pressure variations at various points therein.

The circuit shown in the drawing simply comprises a pair of flueric rectifier elements 10, 12 and a flueric proportional amplifier 14. For demonstrative purposes the high frequency input signal is shown as generated by a wobble plate 15 mounted at the end of a rotating shaft 17. A regulated pressurized air source is connected to conduit 16. This air passes through isolating orifices 18 to conduits 20, 22. These latter conduits open toward the wobble plate 15. This arrangement generates pressure varying signals $f_1$, $f_1'$ in conduits 20, respectively. These cyclic variation, or frequency proportional to the rate of rotation of the shaft to which the wobble plate is attached. The frequency of this signal would vary in direct proportion to the rate of rotation of the shaft 17 and is thus a parametric value signal.

The signals $f_1$, $f_i$ thus generated provide inputs at control ports 26, 28 of the rectifiers 10, 12 respectively. The frequency and phase relationship of the signals $f_1$, $f_i$ are representatively shown adjacent the rectifier elements 10, 12 on a common time basis.

A fluid reference signal generator 30, which can be of the vibrating reed type, provides a common, second input to the other control ports 32, 34 of the rectifiers 10, 12 respectively. Preferably the signal $f_2$ varies between maximum and minimum pressure values which are the same as the limits between the signals $f_1$, $f_i$ vary. The cyclic rate of variation or frequency of the signals $f_2$, is preferably within 10 percent of the frequency of the signals $f_1$, $f_i$. This is shown by the plot of $f_2$ in the drawing.

The net effect of the signals $f_1$, $f_2$ on the power stream of rectifier element 10 provides an output pressure signal at receiver 36 which is shown in the adjacent plot of signal $f_3$6. The output pressure signal resulting from signals $f_1'$, $f_2$, from the receiver 38 of rectifier 12 is shown by the adjacent plot of signal $f_3$8.

It will be seen that the signals $f_3$6, $f_3$8 comprise a plurality of rapid excursions from a maximum value to a lower value and that the lower value periodically varies as a function of the difference in frequency between the input signals to the rectifier elements 10, 12.

The signals $f_3$6, $f_3$8 pass through conduits 40, 42 respectively. Chambers or volumes 44, 46 respectively connect with the passageways 40, 42. These chambers act as filters to remove the rapid excursions in the signals $f_3$6, $f_3$8. As a result, the pressure variations in the portions of the passageways 40, 42 beyond the chambers 44, 46 provide signals which have a frequency equal to the difference between the signals $f_1$, ($f_i'$ ) and $f_2$. This is shown by the adjacent plot of signals $f_d$, $f_d'$. This is shown by the adjacent plot of signals $f_d$ $f_d'$. It will further be noted that the signals $f_d$, $f_d'$ are 180° out of phase provided the desired "push-pull" lower frequency signal. The signals $f_d$, $f_d'$ also vary between the same minimum and maximum pressure values.

The push-pull output signals $f_d$, $f_d'$ may be further amplified by being connected as inputs to the control ports 48, 50 of the proportion amplifier 14. This would provide an amplified output signal $f_o$, $f_o'$ at the receivers 52, 54 of the amplifier 14 as shown by the adjacent plots. The amplifier 14 also rotates the rectifier elements and filtering means from any varying conditions which might occur in other fluidic circuitry in which the low frequency signals might be employed.

While it is generally preferable that the reference signal have a lower frequency than the minimum value of the variable signal ($f_1$, $f_1'$ ) it could also have a higher value than the maximum value of the variable signal. Also in certain cases it could be desirable for the reference signal to be within the range of frequency variation for the variable signal. Additionally there are occasions where both signals could be variable rather than having a fixed reference signal frequency as described.

The above and other variations to the preferred illustrated embodiment will occur to those skilled in the art within the scope of the present inventory concepts which are therefore to be derived solely from the appended claims.

We claim:

1. A fluidic circuit comprising:

first and second fluidic rectifier elements, each having two opposing input means and an output means adapted to provide a signal which varies as a function of the input;

first signal generating means for generating a first oscillating pressure signal;

second signal generating means for generating a second oscillating pressure signal having the same frequency as said first pressure signal and being 180° out of phase therewith;

means connecting said first signal generating means to one input means of the first rectifier;

means connecting said second signal generating means to one input means of the second rectifier;

third signal generating means for generating a third oscillating pressure signal having a different frequency than that of said first and second pressure signals;

means connecting said third signal generating means to said rectifiers at the input means which oppose said one input means; and means for respectively filtering the receiver means output signal of each rectifier element to provide a "push-pull" output signals having a low frequency representing the difference between the frequencies of said first and third signal generating means.

2. A circuit as in claim 1 wherein the one of said signals has a frequency within about 10 percent of the frequency of the other signal.

3. The fluidic circuit in claim 1 wherein each said fluidic rectifier element comprises a power nozzle adapted to issue a power stream, a pair of input ports (control ports) oppositely disposed with respect to the axis of said power nozzle, and a receiver downstream of said power nozzle and aligned with the axis thereof.

4. A circuit in claim 1 wherein one of said signals has a fixed reference frequency.

5. A circuit as in claim 4 wherein the reference signal has a frequency lower than that of the other signal.

6. A circuit as in claim 1 wherein:

passageways respectively connect with the receivers means of said rectifier l elements; and the filter means comprise chambers respectively opening into said passageways whereby the "push-pull" output signals are generated in the portions of the passageways downstream of the chambers.

7. A circuit as in claim 6 further including:

a proportional flueric amplifier having opposed control ports directed toward a power stream to vary the recovered pressure in receivers on opposite sides of the nominal path of the power stream; and said passageways are respectively connected to said amplifier control ports to provide an amplified "push-pull" signal at the receivers thereof and to isolate the portions of the circuit, upstream of said passageways, from any loadings incident to using said "push-pull" output signal.